United States Patent
Yoshida et al.

(10) Patent No.: US 9,806,878 B2
(45) Date of Patent: Oct. 31, 2017

(54) CONTROL SYSTEM (71) Applicant: FANUC Corporation, Minamitsuru-gun, Yamanashi (JP)

(72) Inventors: Kouhei Yoshida, Minamitsuru-gun (JP); Yasumichi Sakoda, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 0 days.

(21) Appl. No.: 15/091,633

(22) Filed: Apr. 6, 2016

(65) Prior Publication Data
US 2016/0301521 A1  Oct. 13, 2016

(30) Foreign Application Priority Data

Apr. 10, 2015  (JP) .................................. 2015-080825

(51) Int. Cl.
  H04L 7/00  (2006.01)
  G05B 19/05  (2006.01)
(52) U.S. Cl.
  CPC ............ H04L 7/0087 (2013.01); G05B 19/05 (2013.01); H04L 7/0037 (2013.01)
(58) Field of Classification Search
  CPC ........................... H04L 7/0037; H04L 7/0087
  USPC .................... 375/219–222, 370–375
  See application file for complete search history.

(56) References Cited

U.S. PATENT DOCUMENTS

| | | | |
|---|---|---|---|
| 2005/0270907 A1* | 12/2005 | Yuzawa | G05B 19/054 368/10 |
| 2009/0291681 A1 | 11/2009 | Hara | |
| 2010/0033319 A1* | 2/2010 | Pattok | G08B 17/00 340/538 |
| 2011/0208990 A1* | 8/2011 | Zerbe | G06F 1/08 713/501 |
| 2013/0124888 A1* | 5/2013 | Tanaka | G11C 16/06 713/320 |
| 2014/0101382 A1* | 4/2014 | Kaviani | G06F 12/0246 711/105 |

(Continued)

FOREIGN PATENT DOCUMENTS

| | | |
|---|---|---|
| JP | H09-270802 A | 10/1997 |
| JP | 2009-284066 A | 12/2009 |

(Continued)

OTHER PUBLICATIONS

Notification of Reasons for Refusal dated Apr. 4, 2017 in Japanese Patent Application No. 2015-080825 (2 pages) with an English Translation (2 pages).

*Primary Examiner* — Emmanuel Bayard
(74) *Attorney, Agent, or Firm* — Drinker Biddle & Reath LLP (57) ABSTRACT

In a control system, a controller and a plurality of input/output units are daisy-chained, and each of the input/output units detects a phase difference between a phase of received serial data and a phase of a reference clock, outputs a determination signal if the phase difference exceeds a threshold value, and records the output frequency of the determination signals. The controller acquires the frequency of the determination signals recorded by each of the input/output unit and specifies a noise mixture route based on the acquired frequency of the determination signals.

2 Claims, 6 Drawing Sheets (56) References Cited

U.S. PATENT DOCUMENTS

2015/0372636 A1* 12/2015 Menard .................. F24J 2/5232
        136/246
2016/0049991 A1* 2/2016 Rojas ....................... G06F 1/266
        375/257
2016/0187464 A1* 6/2016 Ginsburg .............. G01S 7/4008
        342/168

FOREIGN PATENT DOCUMENTS

| JP | 2010-004144 A | 1/2010 |
| JP | 2011-103545 A | 5/2011 |

* cited by examiner

| INFORMATION ON CONNECTION OF SLAVES | | | | |
|---|---|---|---|---|
| | | SLAVE NAME | POWER | PHASE DATA |
| SLAVE | 0 | Slave xxxxxx | Power_1 | 18 / 11 |
| | 1 | Slave xxxxxx | Power_1 | 15 / 14 |
| | 2 | Slave xxxxxx | Power_2 | 10 / 00 |
| | 3 | Slave xxxxxx | Power_2 | 00 / 00 |
| | ⋮ | | | |
| | n-1 | Slave xxxxxx | Power_x | 00 / 00 |

CONTROL SYSTEM

RELATED APPLICATION DATA

This application claims priority under 35 U.S.C. §119 and/or §365 to Japanese Application No. 2015-080825 filed Apr. 10, 2015, the entire contents is incorporated herein by reference.

BACKGROUND OF THE INVENTION

1. Field of the Invention

The present invention relates to a control system and, more particularly, to a control system capable of specifying a mixture route of noise which is mixed into daisy-chained input/output units.

2. Description of the Related Art

In a control system where a controller and input/output units are daisy-chained through serial communication, external noise is a factor causing communication failure between devices. In particular, in a control system used in an FA environment such as a factory, in many cases, the external noise causes communication failure, and thus, the countermeasures are required. With respect to the communication failure caused by the external noise, since it is difficult to specify a noise mixture route, in many cases, the cause cannot be specified, or it takes a long period of time to investigate the cause. Therefore, in order to solve the problem early, it is important to determine the noise mixture route.

In the related art, Japanese Patent Application Laid-Open No. 2011-103545 discloses a technique where external noise detection units are connected to a plurality of circuits into which external noise is expected to be mixed, data detected by the external noise detection units is stored in a recording unit, and type and mixture route of noise are specified by comparing the stored data with data of a normal period.

However, for applying the above technique, since the detection circuits are necessarily connected to all the external noise mixture routes, in general, circuit size is also increased, and thus, there is a problem in that the cost is increased.

In addition, Japanese Patent Application Laid-Open No. 2010-004144 discloses a controller having a serial communication function including a phase detection circuit outputting a phase difference between a phase of a rising or falling edge of serial data caused by external noise or the like and a phase of a reference clock as phase data.

However, in the above-described controller, although the occurrence of invasion of the external noise can be sensed by detecting the phase difference caused by the external noise, the external noise mixture route cannot be specified.

SUMMARY OF THE INVENTION

In consideration of the above-described circumstances, by applying the invention disclosed in Japanese Patent Application Laid-Open No. 2010-004144 A described above, an object of the invention is to provide a control system with a controller and input/output units being daisy-chained through serial communication, wherein the control system is capable of specifying a mixture route of an external noise causing communication failure.

According to the invention, a control system includes: a controller having a serial communication function; and a plurality of input/output units having a re-clock function, the controller and the input/output units being daisy-chained, and the input/output unit includes: a phase detection circuit detecting a phase of a rising or falling edge of serial data received through serial communication and outputting a phase difference between the phase of the rising or falling edge of the serial data and a phase of a reference clock as phase difference data; a phase determination circuit determining whether or not the phase difference data output from the phase detection circuit exceeds a predetermined range and outputting a determination signal when determined that the phase difference data exceeds the predetermined range; and a first recording unit recording the frequency of the determination signals output by the phase determination circuit. In addition, the controller includes: an acquiring unit acquiring the frequency of the determination signals of each of the input/output units recorded by the first recording unit of the input/output unit by the serial communication function; a noise specifying unit specifying a noise mixture route based on the frequency of the determination signals of each of the input/output units acquired by the acquiring unit; and a notifying unit notifying the noise mixture route specified by the noise specifying unit.

The controller may further include: an input unit inputting a connection configuration of a power supply device connected to the plurality of input/output units; and a second recording unit recording the connection configuration of the power supply device input by the input unit, and the noise specifying unit may be configured so as to specify the noise mixture route based on the frequency of the determination signals of each of the input/output units which is acquired by the serial communication function and the connection configuration of the power supply device which is recorded by the second recording unit.

According to the invention, it is possible to specify a noise mixture route without preparing a particular configuration such as an external noise detection unit. In addition, it is possible to determine whether the noise mixture route is a signal line of serial communication or a power line connected to an input/output unit. Furthermore, it is possible to determine whether noise from the power line is originated from a power supply device or is mixed from a cable connecting the input/output unit and the power supply device.

BRIEF DESCRIPTION OF THE DRAWINGS

The above-described and other objects and features of the invention will be clarified from the following description with reference to the attached drawings including.

DETAILED DESCRIPTION OF THE PREFERRED EMBODIMENTS

<First Embodiment>

First, a control system according to an embodiment of the invention will be described with reference to FIG. 1.

A control system 1 is configured so that a plurality of input/output units (IO units) 21 to 25 is daisy-chained to a controller 10 having a serial communication function. Each of the input/output units 21 to 25 is configured so that a circuit receiving communication data from an upstream device and a circuit receiving communication data from a downstream device are equipped with respective noise detection circuits (described later). In addition, the input/output units 21 to 25 are power-supplied from a plurality of power supply devices 31 to 33.

Figure 1:
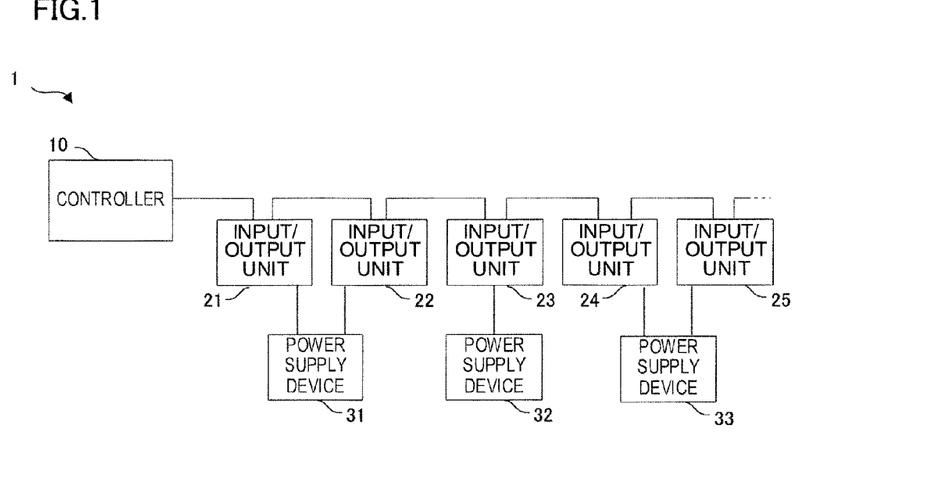
FIG. 1 is a diagram illustrating a control system according to an embodiment of the invention.
Figure 2:
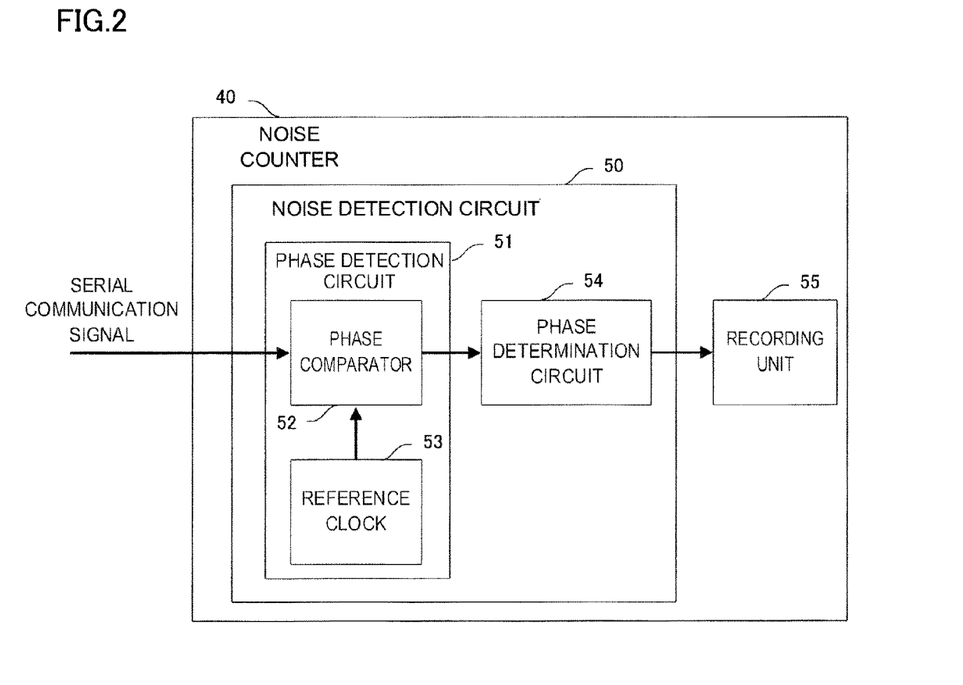
FIG. 2 is a configuration diagram illustrating a noise detection circuit installed in each of input/output units constituting the control system of FIG. 1.

FIG. 2 is configuration diagram of a noise detection circuit 50 installed in each of the input/output units 21 to 25 illustrated in FIG. 1.

As illustrated in FIG. 2, the noise detection circuit 50 includes a phase detection circuit 51 and a phase determination circuit 54. The phase detection circuit 51 and the phase determination circuit 54 are the same as those illustrated in the aforementioned Japanese Patent Application Laid-Open No. 2010-004144.

The phase detection circuit 51 detects a phase of a rising or falling edge of serial data received by a serial communication function of the device and outputs a difference (phase difference) between the detected phase and a phase of a reference clock from a reference clock circuit 53 as phase data.

If external noise is mixed into the serial data under a noisy environment, waveform distortion occurs in the serial data. If the waveform distortion occurs in the serial data, the phase detection circuit 51 receiving the serial data detects a larger phase difference than that of a normal period and outputs the detected phase difference as phase data to the phase determination circuit 54. The phase determination circuit 54 determines whether or not the phase data output from the phase detection circuit 51 exceeds a predetermined range, and if it is determined that the phase data exceeds the predetermined range, the phase determination circuit 54 outputs a determination signal.

The noise detection circuit 50 is embedded in an LSI controlling communication of the input/output units 21 to 25. Since the noise detection circuit 50 is embedded in the LSI controlling serial communication of the input/output units, there is no need to install a detection circuit or the like outside, and there is a merit in that the circuit can be simplified in terms of cost and space saving.

In addition, each of the input/output units 21 to 25 includes a recording unit 55 recording the output frequency of detection signals output for a predetermined time by the noise detection circuit 50 (phase determination circuit 54). The recording unit 55 may be an internal memory (counter) of the communication control LSI. In this case, a combination of the noise detection circuit 50 and the recording unit 55 is called a noise counter 40.

Figure 3:
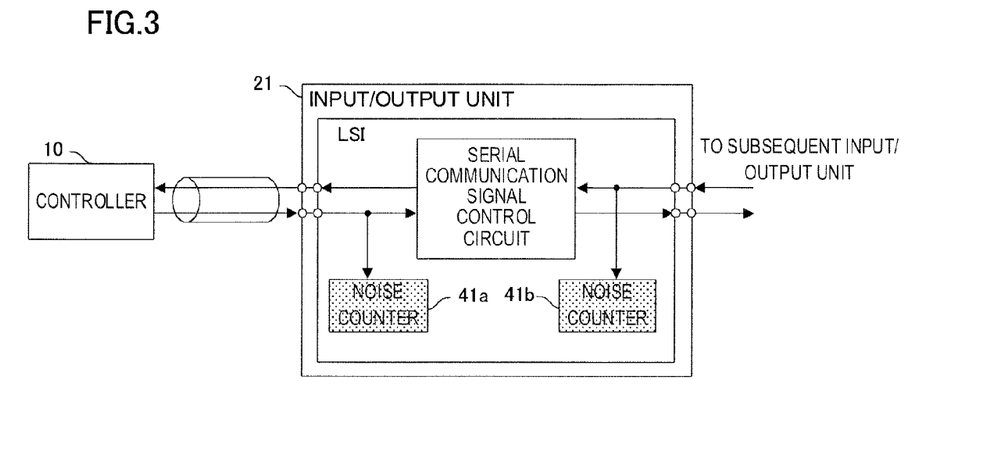
FIG. 3 is a main block diagram illustrating each of the input/output units constituting the control system of FIG. 1.

As illustrated in FIG. 3, the controller 10 is configured to be communicable with each of the input/output units 21, 22, . . . via serial communication lines, and the controller acquires the frequency the determination signals recorded in a communication LSI of each of the input/output units connected to the controller 10 by the serial communication function. Each of the input/output units 21, 22, . . . is configured to include a first noise counter receiving communication data from an upstream device (controller 10 or input/output units 21, 22, . . . ) and a second noise counter receiving communication data from downstream input/output units 22, 23, . . . . For example, in FIG. 3, the input/output unit 21 is configured to include an upstream noise counter 41a receiving communication data from an upstream controller 10 and a downstream noise counter 41b receiving communication data from the downstream input/output unit 22.

With respect to timing the controller 10 acquires the counter value from each of the input/output units 21, 22, . . . , there are methods of using a start bit as a trigger every certain period or every transmission period. Next, a noise mixture route is specified based on the frequency of determination signals by each of the input/output units, and the specified noise mixture route is displayed on a display screen of the controller 10.

In the above-described control system 1, in a case where an external noise is mixed, the value of the noise counter has a tendency to be increased as follows. By using such a tendency, the noise mixture route is specified.

Case 1: A case where an external noise is mixed into a power supply unit (power supply devices 31, 32, and a power line) of input/output units 21, 22, . . . .

In this case, only in the upstream and downstream noise counters inside the input/output unit where an external noise is mixed into the power supply unit, the upstream noise counter inside an input/output unit located downstream from the above-described input/output unit, and the downstream noise counter inside an input/output unit located upstream from the above-described input/output unit, the counter values are increased.

Case 2: A case where an external noise is mixed into communication lines connecting input/output units.

In this case, only in the downstream noise counter inside the input/output unit located upstream as viewed from the communication line into which an external noise is mixed and the upstream noise counter inside the input/output unit located downstream as viewed from the communication line, the counter values are increased. In addition, with respect to the serial communication signal, since the noise is mixed in the same condition between the upstream direction and the downstream direction, the values of the above-described two noise counters become equal to each other. Therefore, by comparing the values of the noise counters, this case can be discriminated from a case where an external noise is mixed into the power supply unit.

Hereinafter, the aforementioned case 1 and case 2 will be described in detail.

<Case 1>

First, in a case where an external noise is mixed into a power supply unit (a power supply device and a power line) of a specified input/output unit, a noise mixture route specifying method is considered.

Figure 4A:
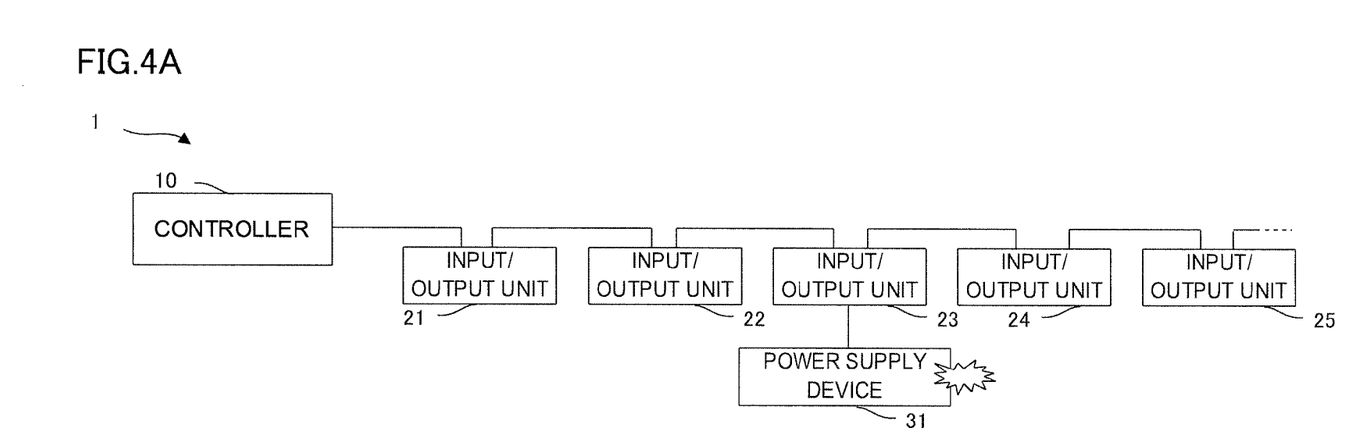
FIGS. 4A and 4B are diagrams illustrating a method of specifying a mixture route of external noise which is mixed into a power supply unit of the control system according to a first embodiment of the invention.
Figure 4B:
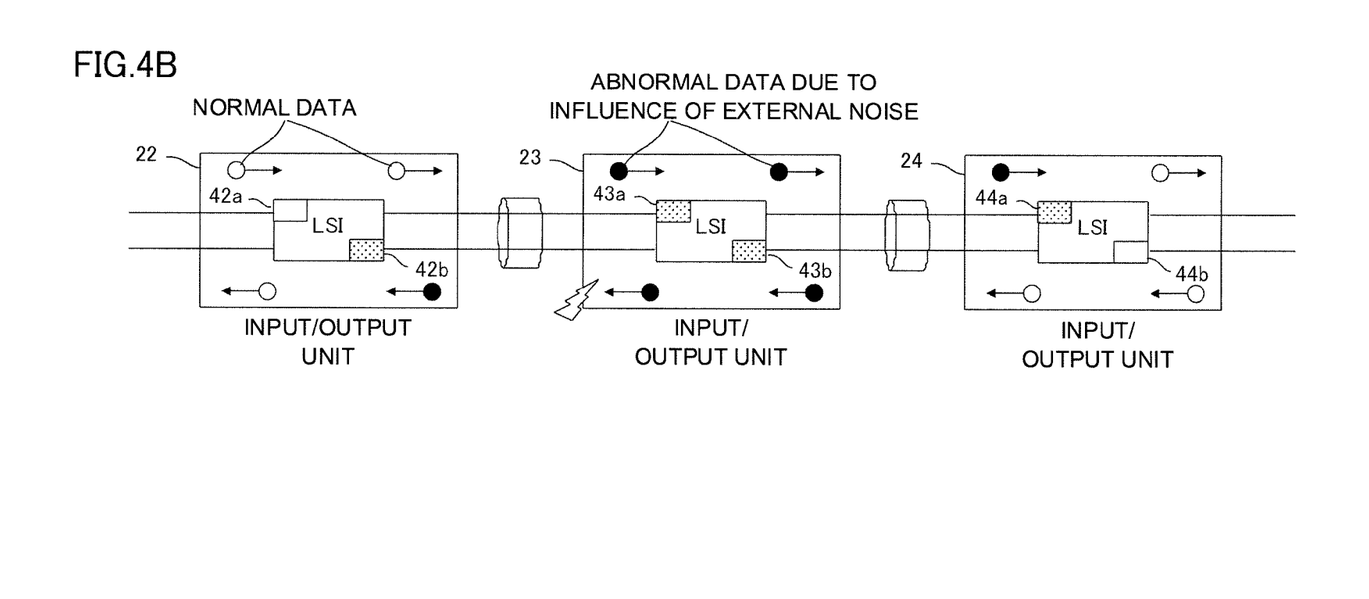

For example, as illustrated in FIG. 4A, in a case where an external noise is mixed into the power supply device 31 of the input/output unit 23, specifying of the noise mixture route is carried out as follows. Furthermore, hereinafter, as illustrated in FIG. 4B, the input/output unit 22 is configured to include an upstream noise counter 42a and a downstream noise counter 42b; the input/output unit 23 is configured to include an upstream noise counter 43a and a downstream noise counter 43b; and the input/output unit 24 is configured to include an upstream noise counter 44a and a downstream noise counter 44b.

[Route from Controller 10 to Input/Output Unit 22 in FIG. 4A]

Since the serial communication signal on the path is not influenced by the external noise, the counter value of the upstream noise counter 41a included in the input/output unit 21 and the counter value of the upstream noise counter 42a included in the input/output unit 22 are not increased.

[Route from Input/Output Unit 22 to Input/Output Unit 23]

The serial communication signal transmitted from the input/output unit 22 to the input/output unit 23 is a normal communication signal. However, as illustrated in FIG. 4A, since an external noise is mixed into the power supply device 31 of the input/output unit 23, the waveform of the serial communication signal in the circuit inside the input/output unit 23 is distorted. Therefore, the counter value of the upstream noise counter 43a included in the input/output unit 23 is increased.

[Route from Input/Output Unit 23 to Input/Output Unit 24]

Since an external noise is mixed into the power supply device 31 of the input/output unit 23, the communication signal transmitted from the input/output unit 23 to the input/output unit 24 becomes an abnormal communication signal. In this case, the counter value of the upstream noise counter 44a included in the input/output unit 24 is increased.

[Route from Input/Output Unit 24 to Subsequent Stage]

In an input/output unit having a re-clock function, if a serial signal is input into the input/output unit, once the serial signal is buffered as bit stream data by a circuit inside an LSI for control inside the input/output unit, and the serial signal is output based on an inner operating clock of the input/output unit.

Therefore, the communication signal input to the input/output unit 24 becomes an abnormal signal, but the communication signal output from the input/output unit 24 becomes a normal waveform which does not include distortion caused by noise. For this reason, the counter value of the noise counter inside the input/output unit subsequent to the input/output unit 24 is not increased.

[Route from Input/Output Unit 24 to Input/Output Unit 23]

With respect to the communication signal transmitted from the input/output unit 24, since an external noise is mixed into the power supply device 31 in the input/output unit 23, an abnormal communication signal is received by the input/output unit 23. Therefore, the counter value of the downstream noise counter 43b included in the input/output unit 23 is increased.

[Route from Input/Output Unit 23 to Input/Output Unit 22]

Since an external noise is mixed into the power supply device 31 of the input/output unit 23, the communication signal from the input/output unit 23 to the input/output unit 22 becomes an abnormal communication signal. In this case, the counter value of the downstream noise counter 42b included in the input/output unit 22 is increased.

[Route from Input/Output Unit 22 to Preceding Stage]

The communication signal output from the input/output unit 22 in the upstream direction is a normal communication signal. For this reason, the counter value of the noise counter in the upstream direction from the input/output unit 22 is not increased.

The controller 10 acquires the values of the noise counter obtained in the above-described stages, and the acquired values of the noise counter are stored in a storage device inside the controller 10. It is understood with reference to data stored in the storage device that the counter value of the downstream noise counter 42b included in the input/output unit 22, the counter values of the upstream and downstream noise counters 43a and 43b included in the input/output unit 23, and the counter value of the upstream noise counter 44a included in the input/output unit 24 are increased.

Figure 5:
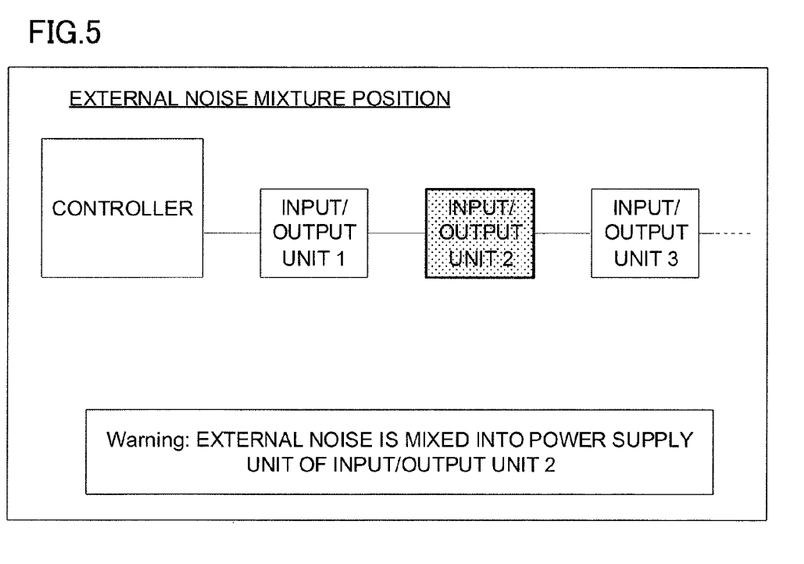
FIG. 5 is an example of notifying the mixture route of external noise which is mixed into the power supply unit of the control system according to the first embodiment of the invention.

When the counter value as described above is obtained, it is determined that there is an external noise mixed into power supply unit (power line and power supply device) of the input/output unit 23. Next, the specified position is notified to an operator by displaying the position on a display screen of the controller 10, for example, as illustrated in FIG. 5. Besides the screen, the method of notifying may be an LED or a lamp.

<Case 2>

Next, a method of specifying a noise mixture route will be considered in a case where an external noise is mixed into a communication line connecting input/output units.

Figure 6A:
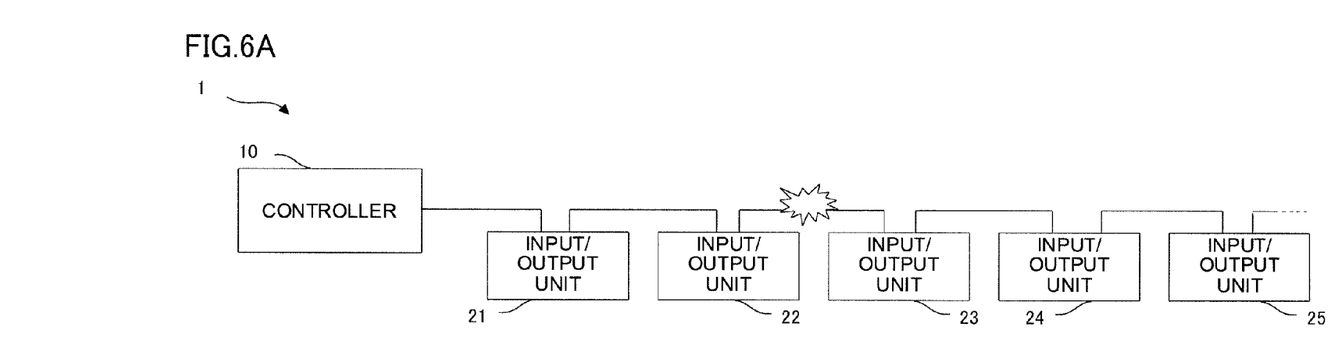
FIGS. 6A and 6B are diagrams illustrating a method of specifying the mixture route of external noise which is mixed into a communication line of the control system according to the first embodiment of the invention.

For example, as illustrated in FIG. 6A, in a case where an external noise is mixed into the communication line connecting the input/output unit 22 and the input/output unit 23, the noise mixture route is specified as follow.

[Route from Numeric Controller 10 to Input/Output Unit 22]

Since the serial communication signal on this path is not influenced by the external noise, the counter value of the upstream noise counter 41a (not shown) included in the input/output unit 21 and the counter value of the upstream noise counter 42a included in the input/output unit 22 are not increased.

[Route from Input/Output Unit 22 to Input/Output Unit 23]

Since an external noise is mixed from the communication line connecting the input/output unit 22 and the input/output unit 23, it is considered that the waveform of the serial communication signal input to the input/output unit 23 is distorted. For this reason, the counter value of the upstream noise counter 43a included in the input/output unit 23 is increased.

[Route from Input/Output Unit 23 to Subsequent Stage]

As described above, although the distorted communication waveform is input to an input/output unit having a re-clock function, the input/output unit outputs a normal communication signal. For this reason, although the distorted communication waveform is input to the input/output unit 23 having a re-clock function, the data output from the input/output unit 23 becomes normal data. As a result, the counter value of the noise counter inside each of the input/output units 25, . . . at the downstream of the input/output unit 24 is not increased.

[Route from Input/Output Unit 23 to Input/Output Unit 22]

Since an external noise is mixed from the communication line connecting the input/output unit 22 and the input/output unit 23, it is considered that the waveform of the serial communication signal input from the input/output unit 23 to the input/output unit 22 is distorted. Therefore, the counter value of the downstream noise counter 42b included in the input/output unit 22 is increased.

[Route from Input/Output Unit 22 to Preceding Stage]

The communication signal output from the input/output unit 22 in the upstream direction is a normal communication signal. For this reason, the counter value of the downstream noise counter 41b (not shown) included in the input/output unit 21 is not increased.

Figure 6B:
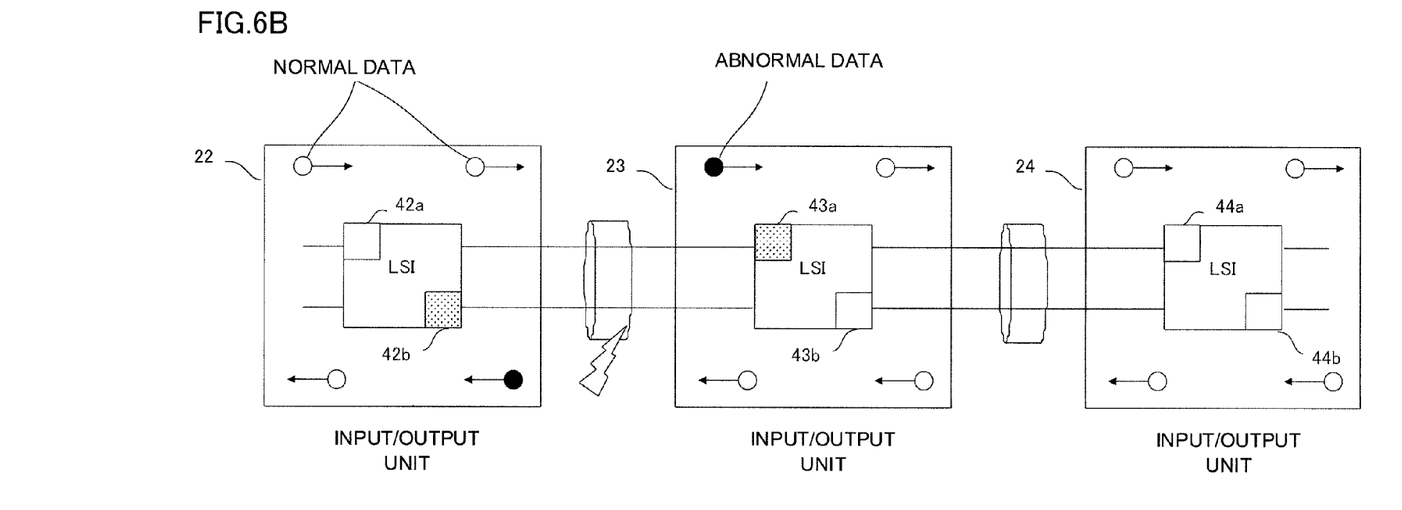
Figure 7:
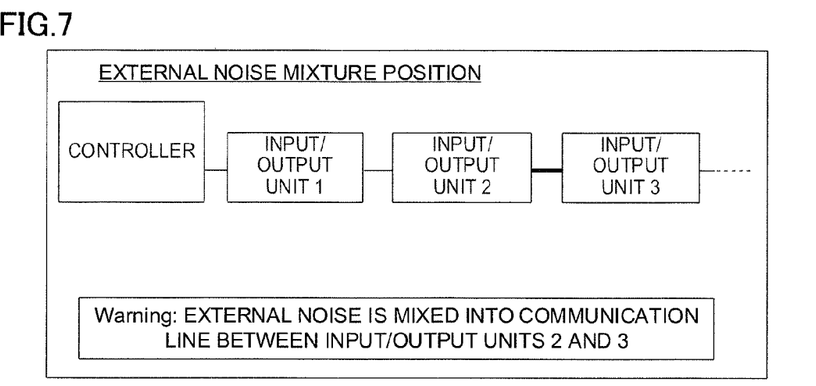
FIG. 7 is an example of notifying the mixture route of external noise which is mixed into the communication line of the control system according to the first embodiment of the invention.

The controller 10 acquires the obtained values of the noise counter from the input/output units and stores the values in the storage device inside the controller. In a case where the value of the determination signal of the downstream noise counter 42b included in the input/output unit 22 and the value of the determination signal of the upstream noise counter 43a included in the input/output unit 23 are increased from the stored data, it is determined that there is an external noise which is mixed into the communication line between the input/output unit 22 and the input/output unit 23. Next, the specified position is notified to an operator on a screen of display of the controller, for example, as illustrated in FIG. 7 or by means of an LED.

In this manner, in the control system according to the embodiment, it is possible to specify a noise mixture route without preparing a particular configuration such as an external noise detection unit, and it can be determined whether the noise mixture route is a signal line for serial communication or a power line connecting the input/output units.

<Second Embodiment>

In a control system according to this embodiment, a mixture route of external noise which is mixed into a power supply device in a power supply unit or a power line is specified based on information on a connection configuration of the power supply device to a plurality of input/output units. A basic configuration of the control system according to the embodiment is the same as that of the first embodiment.

Herein, operating power for the input/output units is supplied from the power supply device. Connection of the power supply device with the input/output units need not be one-to one connection. In many cases, for the purpose of space saving or cost cut, one power supply device may supply power to a plurality of the input/output units.

Figure 8:
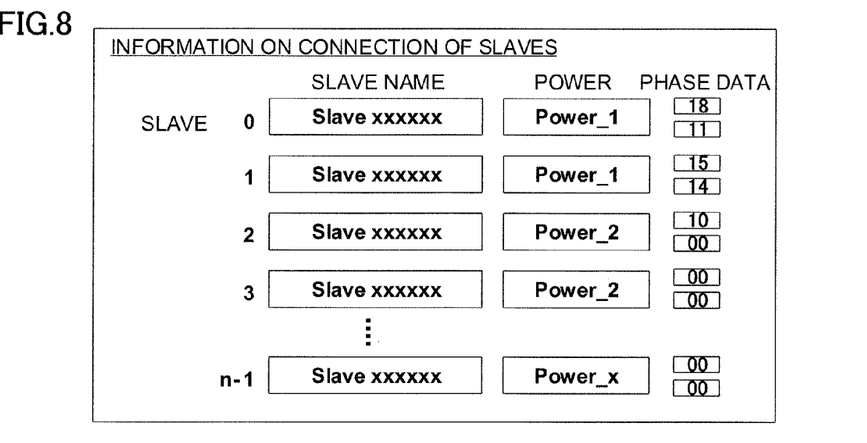
FIG. 8 is an example of a screen where a connection configuration of a power supply device of a control system according to a second embodiment of the invention is input.

A controller 10 is configured so that it can input a connection configuration of a power supply device connected to a plurality of input/output units as described above. FIG. 8 shows an example of a display screen of a controller 10 in which n input/output units as slaves are daisy-chained to the controller 10 as a master and x power supply devices are provided to these input/output units, wherein which of the power supply devices supplies power to which of the input/output units as slaves is input to the display screen of the controller 10. The connection configuration of input power is stored in the controller 10 by means of a recording unit (not shown) provided inside the controller 10.

The controller 10 specifies a noise mixture route based on the frequency of determination signals by each of the input/output units acquired by a serial communication function and the connection configuration of power source of each of the input/output units recorded by the recording unit of the controller 10.

As described in the first embodiment, a case where external noise is mixed into a power supply unit (a power line and a power supply device) and a case where external noise is mixed into a communication line can be distinguished based on the frequency of determination signals by each of the input/output units which is acquired by the serial communication function. However, when a plurality of the input/output units are installed inside a machine tool, in many cases, power is input to some of the input/output units from a common power supply device. Herein, if an external noise is mixed into the common power supply device, then the external noise is considered to be mixed into the power supply units of all the input/output units connected to the common power supply device.

Figure 9A:
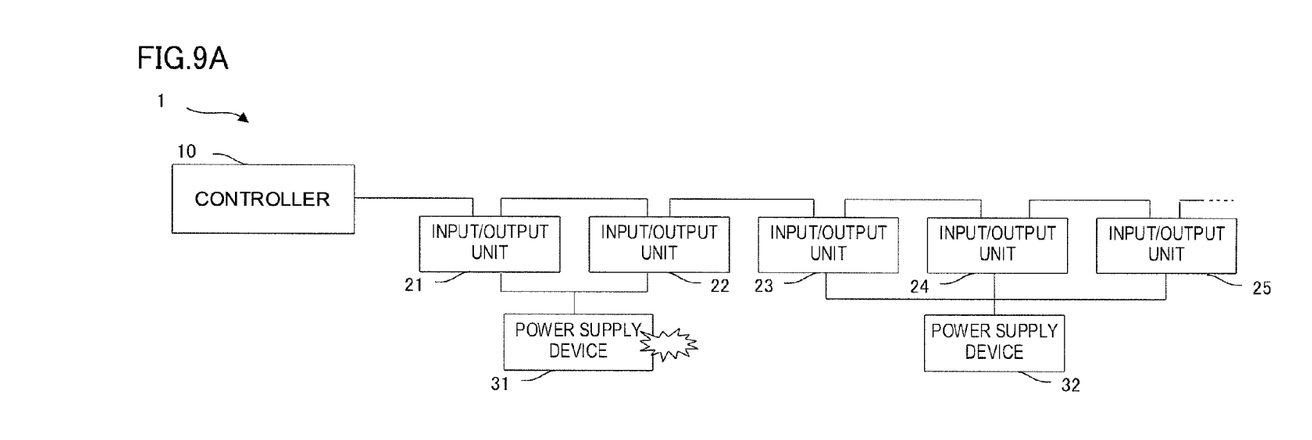
FIGS. 9A and 9B are diagrams illustrating a method of specifying a mixture route of external noise which is mixed into the power supply device of the control system according to the second embodiment of the invention.

For example, according to a connection configuration of the control system 1 illustrated in FIG. 9A, from among input/output units 21 to 25, two input/output units 21 and 22 are supplied with power by one power supply device 31 and three input/output units 23 to 25 are supplied with power by one power supply device 32.

Figure 9B:
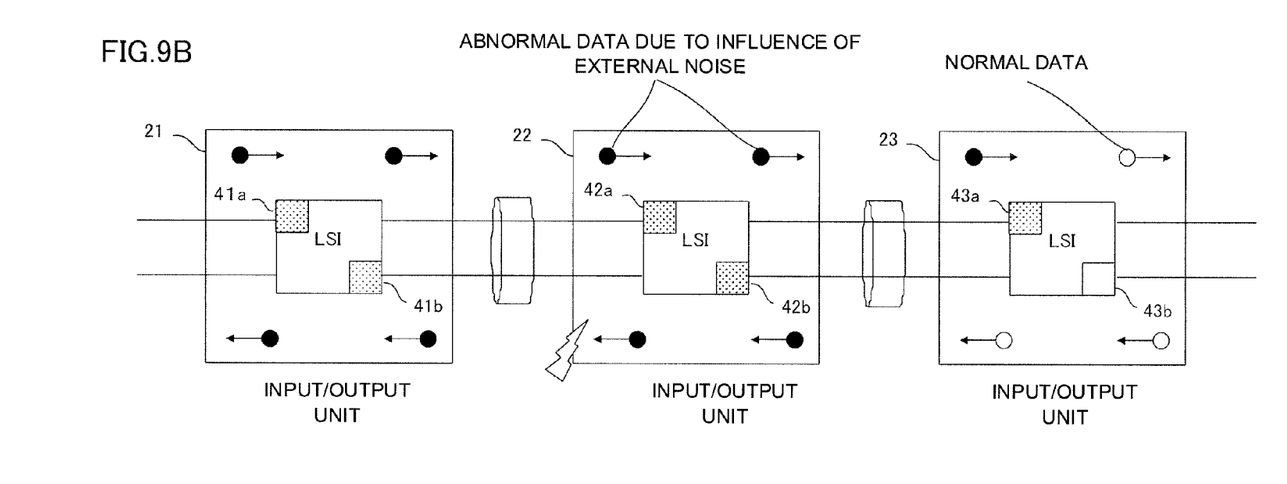

In the control system 1 illustrated in FIG. 9A, in order to specify which of the power supply devices is connected to which of the input/output units, abbreviated names of the power supply devices connected to each of the input/output units 21 to 25 are input to the controller 10. In this case, for example, if there is an external noise which is mixed into the power supply device 31, an external noise is also mixed into the input/output unit 21 and the input/output unit 22 which are connected to the power supply device 31. Therefore, as illustrated in FIG. 9B, the values of the upstream and downstream noise counters 41a and 41b included in the input/output unit 21, the values of the upstream and downstream noise counters 42a and 42b included in the input/output unit 22, and the value of the upstream noise counter 43a included in the input/output unit 23 are increased, in the same manner as in the first embodiment described above. Therefore, as described in the first embodiment, by analyzing the values of the noise counters, the controller 10 can specify the fact that an external noise is mixed into the power supply unit of the input/output unit 21 and the power supply unit of the input/output unit 22.

Figure 10:
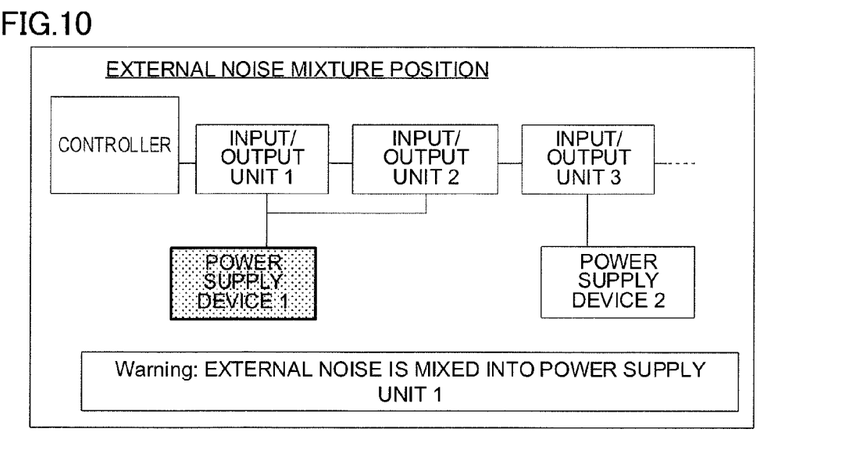
FIG. 10 is an example of notifying the mixture route of external noise which is mixed into the power supply device of the control system according to the second embodiment of the invention.

In addition, since it can be recognized, from the information on the connection configuration of the power supply device which is input to the controller 10, that the input/output unit 21 and the input/output unit 22 are connected to the same power supply device 31, it can be determined that an external noise is mixed into the power supply device 31. In addition, the specified position may be displayed on a display screen of the controller 10 as illustrated in FIG. 10 or may be notified to an operator by means of an LED or the like.

In addition, if the value of the downstream noise counter 41b included in the input/output unit 21, the value of the upstream and downstream noise counters 42a and 42b included in the input/output unit 22, and the value of the upstream noise counter 43a included in the input/output unit 23 are increased, as described in the first embodiment, the controller 10 can specify the mixing of the external noise into the power supply unit of the input/output unit 22.

In addition, it can be recognized, from the information on the connection configuration of the power supply device which is input to the controller 10, that the input/output unit 21 and the input/output unit 22 are connected to the same power supply device 31. Herein, if the noise is mixed into the power supply device 31, the value of the noise counter 41a included in the input/output unit 21 is also increased. However, as described, since the value of the noise counter 41a is not increased, the controller 10 can determine that an external noise is mixed into the cable connecting the power supply device 31 and the input/output unit 22, not mixed into the power supply device 31.

In this manner, in the control system according to the embodiments, information on the connection configuration of power source of each input/output unit is recorded in the recording unit of the controller, and it can be determined based on the information on the connection configuration of power source and the frequency the determination signals counted by the noise counter of each input/output unit whether the noise from the power line is originated from the power supply device or is mixed from the cable connecting the input/output unit and the power supply device.

Heretofore, while the embodiments of the invention are described, the present invention is not limited to the above-described embodiments, but various configurations can be implemented by making appropriate changes to the embodiments.

For example, although the connection configuration of the power supply device in the control system according to the second embodiment is manually input, in the case of using input/output units having a configuration capable of acquiring information on the power supply device, information on the connection configuration of the power supply device may be configured to be automatically acquired.

The invention claimed is:

1. A control system comprising:
   a controller having a serial communication function; and
   a plurality of input/output units having a re-clock function, the controller and the input/output units being daisy-chained, wherein each input/output unit includes:
   a phase detection circuit detecting a phase of a rising or falling edge of serial data received through serial communication and outputting a phase difference between the phase of the rising or falling edge of the serial data and a phase of a reference clock as phase difference data;
   a phase determination circuit determining whether the phase difference data output from the phase detection circuit exceeds a predetermined range and outputting a determination signal when determined that the phase difference data exceeds the predetermined range; and
   a first recording memory unit recording a frequency of the determination signal output by the phase determination circuit, and
   wherein the controller is configured to:
   acquire the frequency of the determination signal of each of the input/output units recorded by the first recording memory unit of the respective input/output unit by the serial communication function;
   specify a noise mixture route based on the acquired frequency of the determination signal of each of the input/output units; and
   notify the specified noise mixture route.

2. The control system according to claim 1, wherein the controller is further configured to:
   input a connection configuration of a power supply device connected to the plurality of input/output units; and
   record the inputted connection configuration of the power supply device,
   wherein specifying the noise mixture route based on the acquired frequency of the determination signal of each of the input/output units is configured so as to specify the noise mixture route based on the acquired frequency of the determination signal of each of the input/output units which is acquired by the serial communication function and the inputted connection configuration of the power supply device.

* * * * *